United States Patent Office 3,403,143
Patented Sept. 24, 1968

3,403,143
WATER-SOLUBLE BASIC MONO- AND
DIS-AZO DYESTUFFS
Visvanathan Ramanathan, Basel, Switzerland, assignor to Ciba Limited, Basel, Switzerland
No Drawing. Filed Nov. 8, 1965, Ser. No. 506,829
Claims priority, application Switzerland, Nov. 11, 1964, 14,524/64; Apr. 23, 1965, 5,665/65
8 Claims. (Cl. 260—158)

ABSTRACT OF THE DISCLOSURE

Water-soluble basic azo dyestuffs of the benzene thiazole- or thiadiazoleazo-o-aminonaphthalene series containing a quaternized amino group bound via an N-alkylsulfonylamino- or an alkylsulfone bridge to the coupling component.

The present invention is based on the observation that valuable water-soluble azo dyestuffs free from acidic groups imparting solubility in water, especially sulfonic acid and carboxylic acid groups, that correspond to the general formula (1)   A—N=N—B in which A represents the radical of an aromatic or heterocyclic amine and B represents an amino naphthalene radical bound to the azo group in ortho- or para-position to the amino group and which contains a group of the formula (2)
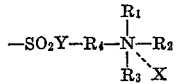

in which Y represents an —NH— group or a direct bond, $R_4$ represents an aliphatic radical, $R_1$, $R_2$ and $R_3$ represent alkyl or aralkyl groups, or $R_1$, $R_2$ and $R_3$ together with the nitrogen atom form a heterocyclic ring and X represents an anion, are obtainable when (a) an azo dyestuff of the formula indicated, in which B represents an amino naphthalene radical bound to the azo group in ortho- or para-position to the amino group and which contains a group of the formula (3)
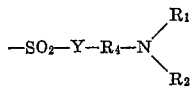

is treated with an alkylating agent, or (b) a diazo compound of an aromatic or heterocyclic amine is coupled with an amino naphthalene which couples in ortho- or para-position to the amino group and which contains a group of the Formula 2.

The diazo components used are preferably aminobenzenes, especially those of the formua (4)
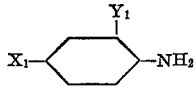

in which $X_1$ represents a hydrogen or halogen atom or a cyano, carbalkoxy, alkylsulfonyl, or phenylazo group or especially a nitro group and $Y_1$ represents hydrogen or halogen atom, a nitro, alkyl, alkoxy, trifluoromethyl, carbalkoxy or cyano group at least one of the symbols $X_1$ and $Y_1$ representing a nitro, carbalkoxy, cyano, alkylsulfonyl or phenylazo group. As examples of diazo components there may be mentioned 1-amino-4-chlorobenzene,
1-amino-4-bromobenzene,
1-amino-4-methylbenzene,
1-amino-4-nitrobenzene,
1-amino-4-cyanobenzene,
1-amino-2,5-dicyanobenzene,
1-amino-4-carbalkoxybenzene,
1-amino-2,4-dichlorobenzene,
1-amino-2,4-dibromobenzene,
1-amino-2-methyl-4-chlorobenzene,
1-amino-2-trifluoromethyl-4-chlorobenzene,
1-amino-2-cyano-4-chlorobenzene,
1-amino-2-cyano-4-nitrobenzene,
1-amino-2-carbomethoxy4-chlorobenzene,
1-amino-2-carbomethoxy-4-nitrobenzene,
1-amino-2-chloro-4-cyanobenzene,
1-amino-2-chloro-4-nitrobenzene,
1-amino-2-chloro-4-carbethoxybenzene,
1-amino-2,4-dinitrobenzene,
1-amino-2,4-dicyanobenzene,
1-amino-2,6-dichloro-4-cyanobenzene,
1-amino-2,6-dichloro-4-nitrobenzene,
1-amino2,4-dicyano-6-chlorobenzene,
1-amino-2,4-dinitro-6-chlorobenzene,
4-amino-azobenzene,
4-amino-2'-chloroazobenzene,
4-amino-2',4'-dichloroazobenzene,
4-amino-3'-chloroazobenzene,
4-amino-2'-nitroazobenzene,
4-amino-3-nitroazobenzene,
4-amino-3'-nitroazobenzene,
4-amino-2-methylazobenzene,
4-amino-4'-methoxyazobenzene,
4-amino-3-nitro-2'-chloroazobenzene,
4-amino-3-nitro-4'-chloroazobenzene,
4-amino-3-nitro-2',4'-dichloroazobenzene, and
4-amino-3-nitro-4'-methoxyazobenzene.

Heterocyclic diazo components that may be mentioned are, for example, 2-aminothiazoles, preferably 2-amino-5-nitrothiazoles or especially 2-aminobenzthiazoles, for example, 2-aminothiazole,
2-amino-5-nitrothiazole,
2-amino-5-cyanothiazole,
2-amino-4-methyl-5-nitrothiazole,
2-amino-4-methylthiazole,
2-amino-4-phenylthiazole,
2-amino-4-(4'-chloro)-phenylthiazole,
2-amino-4-(4'-nitro)-phenylthiazole,
2-aminobenzthiazole,
2-amino-6-methylbenzthiazole,
2-amino-6-methoxybenthiazole,
2-amino-6-chlorobenzthiazole,
2-amino-6-nitrobenzthiazole, and also
2-amino-1,3,4-thiadiazole and
2-amino-1,3,5-thiadiazole.

The coupling components used are preferably compounds of the formula (5)

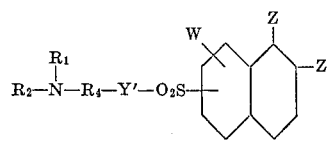

in which $R_1$ and $R_2$ have the meanings given above, $R_4$ represents an alkylene radical, especially a radical of the formula $-(CH_2)_n-$, in which $n$ represents an integer from 2 to 6, $Y'$ represents an $-NH-$ group, one Z represents an amino group and the other Z represents a hydrogen atom and W represents a hydrogen atom or a hydroxyl group.

Compounds of the Formula 5 are obtainable by condensing a 2-amino naphthalene sulfonic acid chloride with an alkylene diamine of the formula (6)

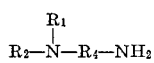

in which $R_1$, $R_2$, and $R_4$ have the meanings given above. As examples of amino-naphthalene sulfonic acid chlorides there may be mentioned the chlorides of 2-amino-naphthalene-3-, -4-, -6-, -7- or -8-sulfonic acid, of 1-aminonaphthalene-4-sulfonic acid and the derivatives thereof substituted in the amino group by alkyl groups, for example, methyl, ethyl, propyl or butyl radicals, as well as the chlorides of 2-amino-8-hydroxy-naphthalene-5-, -6- or -7-sulfonic acid. These are to be reacted with amines of the Formula 6, for example, with β-dimethylamino-ethylamine, β-diethylamino-ethylamine, β - di - n-propylamino-ethylamine, β-di-n-butylamino - ethylamine, β-morpholyl-ethylamine, β - piperidyl - ethylamine, γ - dimethylamino-propylamine, γ-diethylamino-propylamine, γ-di-n-propylamino-propylamine, γ-di-n-butylamino-propylamine, γ - morpholyl-propylamine, γ-piperidyl-propylamine.

Diazotization of the above-mentioned diazo components may be carried out by known methods, for example, with the aid of a mineral acid, especially hydrochloric acid, and sodium nitrite.

Coupling may likewise be carried out in known manner, for example, in a neutral to alkaline medium, if necessary, in the presence of sodium acetate or a similar buffer that influences the rate of coupling or a catalyst, for example, pyridine or a salt thereof.

In accordance with the process of the present invention, the azo dyestuffs containing the radical of the Formula 3 which are obtained by coupling the diazo components with the amino-naphthalenes are treated with alkylating agents, advantageously alkyl or aralkyl halides or alkyl or aralkyl esters of sulfuric acid or organic sulfonic acids. As examples of alkylating agents there may be mentioned: methyl chloride, methyl bromide, methyl iodide, benzyl chloride, trimethyloxonium boron fluoride, dimethyl sulfate, diethyl sulfate, benzene sulfonic acid methyl ester, para-toluene sulfonic acid butyl ester. Alkylation is advantageously effected by heating in an inert organic solvent, for example, a hydrocarbon for example benzene, toluene and xylene, a halogenated hydrocarbon for example carbon tetrachloride, tetrachloroethane, chlorobenzene or ortho-dichlorobenzene or a nitro-hydrocarbon for example nitromethane, nitrobenzene or a nitronaphthalene.

In method (b) of the process of the invention, a diazo compound of an aromatic or heterocyclic amine is advantageously coupled with a coupling component of the formula (7)

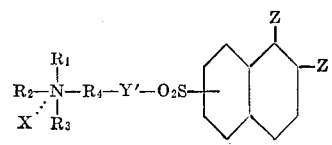

in which $R_1$, $R_2$, $R_3$, $R_4$, X, $Y'$ and Z have the meanings given above.

The compounds of the Formula 7 are obtainable by treating a compound of the Formula 5 with an alkylating agent.

Coupling is carried out in known manner.

Purification of the dyestuff salts is advantageously effected by dissolving them in water, and filtering any unreacted starting dyestuff as an insoluble filter radical. The dyestuff can be salted out of the aqueous solution by the addition of a water-soluble salt, for example, sodium chloride.

The dyestuffs obtained by the process of the invention advantageously contain as anion the radical of a strong acid, for example, sulfuric acid or the semi-ester thereof or the radical of an arylsulfonic acid or a halogen ion. The above-mentioned anions that are introduced into the dyestuff molecule in accordance with the process of the invention may be replaced by anions of other inorganic acids, for example, phosphoric acid or sulfuric acid or of organic acids, for example, formic, acetic, chloroacetic, oxalic, lactic or tartaric acid; in some cases it is also possible to use the free bases. The dyestuff salts may also be used in the form of double salts, for example, with halides of elements of Group II of the periodic table, especially zinc chloride or cadmium chloride.

The dyestuff salts obtainable by the process of the present invention are suitable for dyeing and printing a very wide variety of materials, for example, tannin-mordanted cellulosic fibers, silk, hairs, leather and also synthetic fibers, especially polyacrylonitrile and polyvinylidene cyanide (Darvan). The dyeings produced on these fibers are distinguished by a good fastness to light. The dyestuffs also reserve well on wool, which makes them specially suitable for dyeing union fabrics containing polyacrylonitrile. The dyeings also display a good fastness to carbonizing.

The following examples illustrate the invention. Unless otherwise stated, the parts and percentages are by weight.

EXAMPLE 1

17.3 parts of 2-chloro-4-nitraniline are diazotized in known manner and the diazo compound is coupled with 30.7 parts of 2-naphthylamine-5-(3'-dimethylamino-n-propyl)-sulphonamide in hydrochloric acid solution. After the coupling the suspension is rendered slightly alkaline with sodium hydroxide solution and the dyestuff formed is isolated by filtration, washed with water and dried.

The coupling component used is obtainable by condensing 2-acetylaminonaphthalene-5-sulphochloride with 3-dimethylamino-1-propylamine and splitting off the acetyl group.

7.35 parts of the azo dyestuff obtained in the manner described in the first paragraph are dissolved in 75 parts by volume of warm chlorobenzene and then 2.8 parts of dimethyl sulphate in 10 parts by volume of chlorobenzene are added dropwise at about 100° C. while stirring. Stirring is then continued for 2 hours at about 100° C. After cooling the reaction mixture the precipitated product is isolated by filtration. The filter cake is dissolved in hot water, clarified by filtration and the filtrate is treated with a little salt to precipitate the dyestuff which is isolated by filtration and dried. It dyes polyacrylonitrile fibres red tints having excellent properties of fastness.

Further dyestuffs are obtainable when the dyestuffs listed in Column I of the following table are alkylated with dimethyl sulphate in the manner indicated in the second paragraph above. Column II indicates the tint obtainable on polyacrylonitrile fibres. The starting materials are obtainable by coupling the appropriate components in the manner described in the first paragraph above.

| I Starting materials | II Tint |
|---|---|
| 1. $O_2N-\text{C}_6H_4-N=N-\text{naphthyl}(NH_2)(SO_2NH(CH_2)_3N(CH_3)_2)$ | Scarlet. |
| 2. $\text{C}_6H_5-N=N-\text{C}_6H_4-N=N-\text{naphthyl}(NH_2)(SO_2NH(CH_2)_3N(CH_3)_2)$ | Do. |
| 3. $O_2N-\text{C}_6H_3(Cl)-N=N-\text{naphthyl}(NH_2)(SO_2NH(CH_2)_3N(CH_3)_2)$ | Red. |
| 4. $\text{C}_6H_4(NO_2)-N=N-\text{naphthyl}(NH_2)(SO_2NH(CH_2)_3N(CH_3)_4)$ | Orange. |
| 5. $Cl-\text{C}_6H_3(CF_3)-N=N-\text{naphthyl}(NH_2)(SO_2NH(CH_2)_3N(CH_3)_2)$ | Do. |
| 6. $NC-\text{C}_6H_4-N=N-\text{naphthyl}(NH_2)(SO_2NH(CH_2)_3N(CH_3)_2)$ | Do. |
| 7. $O_2N-\text{C}_6H_3(OCH_3)-N=N-\text{naphthyl}(NH_2)(SO_2NH(CH_2)_3N(CH_3)_2)$ | Red. |
| 8. $O_2N-\text{C}_6H_3(Cl)-N=N-\text{naphthyl}(NH_2)(SO_2NH(CH_2)_2N(C_2H_5)_2)$ | Red. |
| 9. $H_5C_2O-\text{benzothiazolyl}-C-N=N-\text{naphthyl}(NH_2)(SO_2NH(CH_2)_3N(CH_3)_2)$ | Red. |
| 10. $O_2N-\text{C}_6H_4-N=N-\text{naphthyl}(NH_2)(OH)(SO_2NH(CH_2)_3N(CH_3)_2)$ | Claret. |

| | I<br>Starting materials | II<br>Tint |
|---|---|---|
| 11 | $O_2N-\langle C_6H_3(Cl)\rangle-N=N-\langle\text{naphthyl}(OH)(SO_2NH(CH_2)_3N(CH_3)_2)\rangle-NH_2$ | Violet. |
| 12 | $O_2N-\langle C_6H_3(CN)\rangle-N=N-\langle\text{naphthyl}(OH)(SO_2NH(CH_2)_3N(CH_3)_2)\rangle-NH_2$ | Bluish violet. |
| 13 | $O_2N-\langle C_6H_3(Cl)\rangle-N=N-\langle\text{naphthyl}(SO_2CH_2CH_2N(CH_3)_2)\rangle-NH_2$ | Claret. |
| 14 | $O_2N-\langle C_6H_4\rangle-N=N-\langle\text{naphthyl}(SO_2NH(CH_2)_3N(CH_3)_2)\rangle-NH_2$ | Red. |
| 15 | $O_2N-\langle C_6H_3(Cl)\rangle-N=N-\langle\text{naphthyl}(SO_2NH(CH_2)_3N(CH_3)_2)\rangle-NH_2$ | Red. |

EXAMPLE 2

13.8 parts of 4-nitraniline are diazotized in known manner and the diazo compound is coupled with 32.1 parts of 2-methylaminonaphthalene-6-(3'-dimethylamino-n-propyl)-sulfonamide in hydrochloric acid solution. After the coupling the suspension is rendered slightly alkaline with sodium hydroxide solution. The dyestuff formed is isolated by filtration, washed with water and dried.

7.05 parts of the azo dyestuff obtained in the manner described above are dissolved in 50 parts by volume of warm nitrobenzene; 3.09 parts of n-butylbromide in 10 parts by volume of nitrobenzene are added dropwise at about 100° C. and the batch is stirred for 5 hours at about 100° C. The reaction mixture is cooled and the precipitated product is isolated by filtration. The filter cake is dissolved in hot water, the solution clarified by filtration and the dyestuff is salted out, isolated by filtration and dried. It dyes polyacrylonitrile fibers red tints having very good properties of fastness.

EXAMPLE 3

20.55 parts of 1-amino-2-chloro-benzene-4-methyl-sulfone are diazotized in known manner and the diazo compound is coupled with 30.7 parts of 2-naphthylamine-6-(3'-dimethyl-amino-n-propyl)-sulfonamide in hydrochloric acid solution. After the coupling the suspension is rendered slightly alkaline with sodium hydroxide solution. The dyestuff formed is isolated by filtration, washed with water and dried.

5.24 parts of the azo dyestuff obtained in the manner described above are dissolved in 100 parts by volume of warm nitrobenzene; 1.9 parts of benzyl chloride in 10 parts by volume of nitrobenzene are added dropwise at about 100° C. while stirring, and the batch is stirred for 4 hours at about 100° C. The reaction mixture is cooled and the precipitated product is isolated by filtration. The filter residue is dissolved in hot water, the solution is clarified by filtration and salted out. The dyestuff is isolated by filtration and dried. It dyes polyacrylonitrile fibres orange tints having very good properties of fastness.

EXAMPLE 4

17.3 parts of 2-chloro-4-nitraniline are diazotized in known manner and the diazo compound is coupled with 32.1 parts of 2-naphthylamine-7-(2'-diethylaminoethyl)-sulphonamide in hydrochloric acid solution. After the coupling the suspension is rendered slightly alkaline with sodium hydroxide solution. The dyestuff formed is isolated by filtration, washed with water and dried.

7.8 parts of the azo dyestuff obtained in the manner described above are dissolved in 50 parts by volume of warm nitrobenzene; 4.2 parts of para-toluene sulphonic acid methyl ester in 10 parts by volume of nitrobenzene are added dropwise at about 100° C. while stirring and the batch is then stirred for 2 hours at about 100° C. The reaction mixture is cooled and the precipitated product is isolated by filtration. The filter residue is dissolved in hot water, the solution clarified by filtration and the filtrate is salted out. The precipitated dyestuff is isolated by filtration and dried. It dyes polyacrylonitrile fibres red tints possessing excellent properties of fastness.

EXAMPLE 5

2.66 parts of 5-amino-3-phenyl-1,2,4-thiodiazole are diazotized in known manner and the diazo compound is coupled with 6.5 parts of 2-naphthylamine-6-(3′-N-methosulphate-dimethylamino-n-propyl)-sulphonamide in hydrochloric acid solution. After the coupling the product is salted out and isolated by filtration. The filter cake is dissolved in hot water, the solution clarified by filtration and salt is again added. The precipitated dyestuff is isolated by filtration and dried. It dyes polyacrylonitrile fibres red tints having excellent properties of fastness.

The coupling component used my be prepared by the following processes:

61.4 parts of 2-acetylaminonaphthalene-6-(3′-dimethylamino-n-propyl)-sulphonamide are dissolved in 200 parts of warm nitrobenzene. 31.5 parts of dimethylsulphate in 60 parts of nitrobenzene are added dropwise at about 100° C. while stirring, and the batch is stirred for 5 hours at about 100° C. After cooling the reaction mixture the nitrobenzene is decanted, the residue is washed free from nitrobenzene with petroleum ether and dried.

7.2 parts of 2-acetylaminonaphthalene-6-(3ιN-methosulphate - dimethylamino-n-propyl) - sulphonamide are boiled under reflux for ½ hour in 56.3 parts of concentrated hydrochloric acid and 62.5 parts of water. The solution thus hydrolysed can be used for coupling.

Further dyestuffs are obtainable when the diazo components listed in Column I of the following table are coupled with the coupling components listed in Column II in the manner described in the first paragraph above.

| | I<br>Diazo component | II<br>Coupling component | III<br>Tint |
|---|---|---|---|
| 1 | 2-amino-5-nitrothiazole | 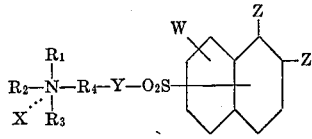 | Violet. |
| 2 | 1-aminobenzene-4-carboxylic acid methyl ester. | Same as above | Orange. |
| 3 | 1-amino-2-chloro-4-nitrobenzene | do | Red. |
| 4 | 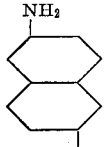 | do | Red. |

EXAMPLE 6

1 part of the dyestuff obtained in the manner described in the first paragraph of Example 1 is dissolved in 5,000 parts of water in the presence of 2 parts of 40% acetic acid, 100 parts of dried yarn made from polyacrylonitrile staple fibres are entered into the dyebath so prepared at 60° C., the temperature is raised to 100° C. during half an hour and dyeing is carried out for one hour at the boil. The yarn is then well rinsed and dried. A red dyeing possessing a very good fastness to light, to sublimation and to washing is obtained.

What is claimed is:

1. A water-soluble azo dyestuff of the formula

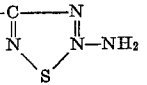

in which Y represents a member selected from the group consisting of an —NH— group and a direct bond, $R_1$, $R_2$ and $R_3$ represent members selected from the group consisting of lower alkyl and benzyl, $R_4$ is lower alkylene, X is a water soluble anion, W is a member selected from the group consisting of a hydrogen atom and a hydroxy group, one Z represents an amino group and the other Z a member selected from the group consisting of the radicals of the formulae

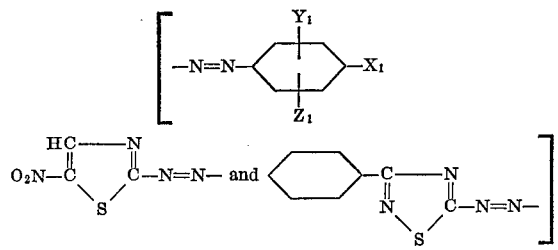

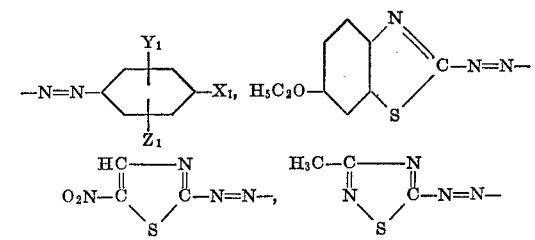

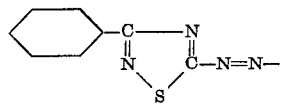

and in which $X_1$ is a member selected from the group consisting of chlorine, nitro, unsubstituted lower carbalkoxy, cyano, phenylazo and lower alkyl-sulfonyl, $Y_1$ and $Z_1$ represent members selected from the group consisting of hydrogen, chlorine, lower alkyl, lower alkoxy, trifluoromethyl, unsubstituted lower carbalkoxy and cyano at least one of the symbols $X_1$ and $Y_1$ representing nitro, unsubstituted lower carbalkoxy, cyano, lower alkyl-sulfonyl or phenylazo.

2. A water-soluble azo dyestuff of the formula

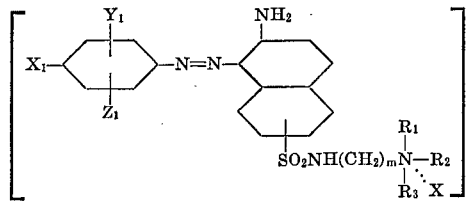

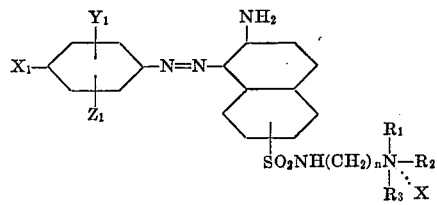

in which $X_1$ is a member selected from the group consisting of chlorine, nitro, carbomethoxy, cyano, phenylazo and methyl-sulfonyl, $Y_1$ and $Z_1$ represent members selected from the group consisting of hydrogen, chlorine, methyl, methoxy, trifluor-methyl, carbomethoxy and cyano, at least one of the symbols $X_1$ and $Y_1$ representing a nitro, carbomethoxy, cyano, methyl-sulfonyl or phenylazo, $R_1$, $R_2$ and $R_3$ represent methyl radicals, $n$ is a number from 2 to 4 and X is a water-soluble anion.

3. The dyestuff of the formula

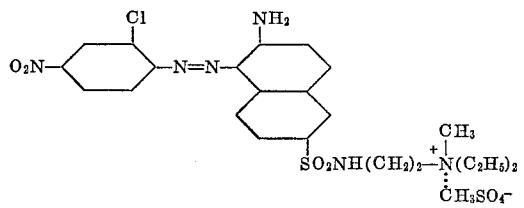

4. The dyestuff of the formula

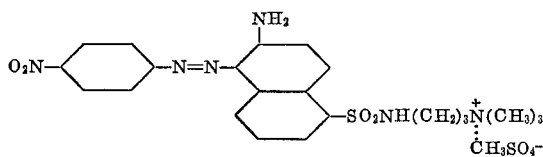

5. The dyestuff of the formula

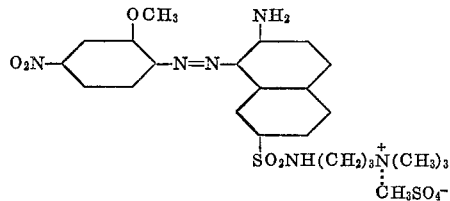

6. The dyestuff of the formula

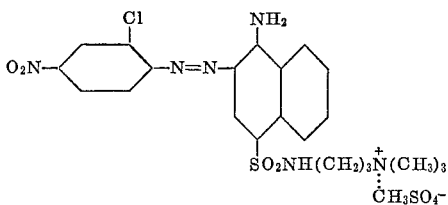

7. The dyestuff of the formula

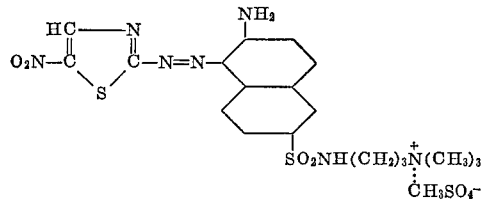

8. The dyestuff of the formula

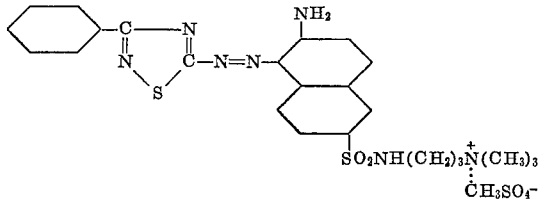

References Cited
UNITED STATES PATENTS
3,346,553   10/1967   Kuhne et al. _____ 260—163

CHARLES B. PARKER, *Primary Examiner.*

D. M. PAPUGA, *Assistant Examiner.*

U.S. DEPARTMENT OF COMMERCE
PATENT OFFICE
Washington, D.C. 20231

UNITED STATES PATENT OFFICE
CERTIFICATE OF CORRECTION

Patent No. 3,403,143                  September 24, 1968

Visvanathan Ramanathan

It is certified that error appears in the above identified patent and that said Letters Patent are hereby corrected as shown below:

Column 10, lines 4 to 13, and lines 60 to 67, cancel all the formulas enclosed within the brackets.

Signed and sealed this 24th day of February 1970.

(SEAL)
Attest:

Edward M. Fletcher, Jr.
Attesting Officer

WILLIAM E. SCHUYLER, JR.
Commissioner of Patents